Patented Jan. 1, 1952

2,580,806

UNITED STATES PATENT OFFICE 2,580,806

DEPOSITION OF A METAL OXIDE CATALYST ON A CARRIER

Louis E. Malina, Philadelphia, Pa., assignor to Eugene J. Houdry

No Drawing. Application April 21, 1950, Serial No. 157,413

9 Claims. (Cl. 252—463)

This invention relates to catalyst manufacture and to improvements in catalytic structure and composition. This application is a continuation in part of my pending application Serial No. 117,500 filed September 23, 1949, entitled "Catalytic Structure and Composition," and which, subsequent to the filing of this application, has been abandoned.

In certain aspects this invention may be considered as an improvement on or further development of the catalytic structures disclosed in a pending application of Eugene J. Houdry, Serial No. 95,031, filed May 24, 1949, in which active catalytic materials are deposited upon a support formed of porcelain or an equivalent substance, i. e., a support which, like porcelain, has of itself substantially no catalytic activity but is compact, strong, relatively impervious or of slight porosity, physically resistant, and capable of sustaining temperature shocks. Upon such a support a base of active alumina (or active magnesia, beryllia or thoria) is deposited or dispersed as a film, the weight of such film being very small in comparison with the weight of the support. Upon the active film or base is deposited a determined amount of finely divided catalyst, such as active catalytic metals or their oxides. In order to obtain a firmly adherent film of active alumina, beryllia, magnesia or thoria, a large number of dippings of the porcelain support into an aluminum, beryllium, magnesium or thorium salt solution was required, each dipping being followed by a heating step to decompose the solution and leave a film deposit on the support. As many as thirty dippings and successive decompositions, and often more, were necessary to obtain a film thickness of the order of .0005". On account of the extreme thinness of this film deposit great care had to be given to the chemical composition of the porcelain support and to its firing, so that it would be devoid of undesirable components which could penetrate the base film and poison either the film or the active metal or metallic oxide catalysts subsequently deposited upon the active base film.

It is a principal object of the present invention to develop a procedure which will speed up the deposit of a base film on inactive stable supports.

Another object is to simplify the process of applying a firmly adherent film of active alumina, beryllia, magnesia or thoria to a porcelain support.

Still another object is to obtain an adherent film of greater thickness than previously possible, so as to prolong the life and improve the efficiency of catalysts.

Still other objects and advantages will be apparent from the detailed description which follows.

It has been discovered that a film coating of the order of .001" to .006" can be obtained readily and with a minimum of dipping or spraying operations by using a film coating material composed of fine to fairly coarse particles of the active oxides of alumina, magnesia, beryllia or thoria dispersed thoroughly and uniformly in a salt or other solution of one of the said metal oxides to form a heterogeneous mixture. The application of the active film coating mixture on inert material such as porcelain is accomplished by dipping to a submerged condition or by spraying. This film coating mixture is applicable to a body of inert material of any size or shape which is to be used for supporting the catalytic base film and thereon other active catalysts such as those mentioned in the said pending Houdry application Serial No. 95,031.

The film coating, heat treated as hereinafter described, remains adherent, intact and resists high temperatures, thermal shocks, humidity and any and all changes under such operating conditions as are described in certain copending applications of Eugene J. Houdry as follows: Serial No. 783,561 filed November 1, 1947; Serial No. 790,214 filed December 6, 1947; Serial No. 790,215 filed December 6, 1947; Serial No. 790,216 filed December 6, 1947, now U. S. Patent No. 2,552,555, and Serial No. 109,288 filed August 9, 1949. A porcelain support plus an active alumina base of a film thickness of .005" impregnated with platinum in the proportion of one per cent by weight of the alumina has been used as an oxidation catalyst in an automobile engine and has performed perfectly the equivalent of many thousands of miles of travel without diminution in efficiency.

In order to obtain the proper thickness, strength and adherence of the film base to the support it has been found that the amount of the dispersed oxide in the metal salt solution should vary with the porosity of the porcelain support. A higher proportion of powdered oxide is required in the heterogeneous mixture when the support is relatively impervious or of slight porosity, and a film thickness of the order of .001" to .002" ordinarily results from one dipping in the mixture. On the other hand a lower proportion of powdered oxide is required in the mixture with low porosities, as from 10 to 20 per cent, in the porcelain supports, but then a film thickness of from .002" to about .005" will ordinarily be obtained with one dipping in the mixture. In other words, the quantity of powdered oxide in the oxide-salt solution mixture should vary in inverse ratio with the porosity in porcelain supports of 20 per cent porosity or less porosity. Before use, the powder and liquid solution are thoroughly mixed and ground together in a pebble or ball mill for an extended period, such as from three to seven hours, to insure the production of a uniformly dispersed mixture.

Ordinarily the mixture comprises one part by weight of active alumina powder to from two and a half to twelve parts by weight of concentrated or saturated aluminum nitrate solution, since the thickness of the film resulting from the use of a given mixture depends upon the porosity of the porcelain support and on its cross sectional area or volume. This is understandable from the fact that the nitrate solution alone penetrates the support, while the fine particles of the alumina powder in the thoroughly ground mixture remain on the surface to form the film. So for a given mixture of powder and solution the film thickness will increase with increases in porosity of the porcelain; and for porcelain supports of the same porosity, film thickness will increase with increases in the volume or cross sectional area of the support.

In its simplest form the process for applying a stable adherent film to inert porcelain supports of slight or low porosity involves the following four distinct steps.

1. The porcelain elements or supports in any size or shape (as disk, cylinder, rod, pellet, etc.) in prefectly clean and dry condition and completely free of contaminants are dipped or immersed in, or thoroughly sprayed with, the heterogeneous mixture of active alumina powder and aluminum nitrate solution described above. Time of impregnation, about five minutes, at room temperature.

2. The porcelain elements are then dried for about a half hour at low temperatures, as up to about 250° F., followed by a progressive rise in temperature into the range of 800 to 1000° F. for a period of about an hour, after which the heat is shut off and the elements allowed to cool slowly to room temperature in about another hour. The drying may be effected by hot air or flue gas saturated with steam, or by infrared rays.

3. The porcelain units are then impregnated again with alumina by dipping or immersing them for about five minutes at room temperature in strong or concentrated aluminum nitrate solution which does not contain aluminum oxide powder.

4. Drying and heat tempering step, same as step two (2).

The purpose of the third and fourth steps is to harden the film established on the porcelain element or support by the first and second steps. In certain instances it has been found advantageous to repeat steps three and four two or three times in order to obtain the desired degree of hardness and stability in the film of alumina laid down by steps one and two. In some instances it has also been advantageous to make a preliminary dip in the aluminum nitrate solution, in which case the steps would be taken in this order: (3), (4), (1), (2), (3), (4). While either of the dipping steps may be repeated, it is unusual for more than four dips to be made of any porcelain support, but each dipping step must be followed by the drying and heat tempering step two or four. However, all film applying operations should end with steps three and four and for most uses the simple four step process of the preceding paragraph is adequate and satisfactory.

The most frequent variations on the simple four step process of two dips only are as follows (omitting mention of the drying and heat tempering step, two or four which must follow each dipping step):

For increased hardness in the alumina film the dipping steps are (1), (3), (3); or (1), (3), (3), (3); or (3), (1), (3), (3);

For increased thickness of film (1), (1), (3); or (1), (1), (3), (3); or (3), (1), (1), (3); or (1), (1), (3), (3).

The degree of porosity of the insert supports is usually a factor in determining the number and order of dips, in addition to the use to which the finished catalyst will be put.

A factor that imposes a practical limit to film thickness of the alumina coating is that when the film is too thick cracking and flaking of the coating may occur. However, so far as is now known there is no use to which the catalyst is subjected requiring a film thickness much greater than .005" or .006", and for many uses films of .001", .002" and .003" are sufficient. Films of the latter thicknesses and up to about .006" can be obtained on most low porosity porcelain elements or supports by the simple four step or two dip process.

While it is preferable to use saturated solutions of aluminum nitrate for both the mixture with powdered alumina and for the film hardening dips in order to obtain maximum thickness of alumina film under a given set of conditions, excellent film depositions are obtained when using unsaturated aluminum nitrate solutions.

A thickness of the active alumina film greater than about .005" can be obtained by repeating the dips (with intermediate drying and heat tempering) in the aluminum oxide powder mixture as previously described, the maximum thickness being around .015", but such greater thicknesses, especially above .01", are usually not practical because of a tendency to flake. Moreover, much thinner than .005" films, such as .001" and even less, give a product of high utility for many uses.

The salt solution need not be aluminum nitrate. For example, sulphuric acid or aluminum sulphate may be substituted for aluminum nitrate solution for making the oxide powder mixtures of aluminum. Similarly acids, chlorides and sulphates of beryllium, magnesium and thorium may be utilized to deposit active films of these materials.

It is to be noted that the porcelain elements or supports to which the alumina film is applied as a base for other catalytic materials have a coefficient of expansion extremely close to the coefficient of expansion of the alumina film. Accordingly the compact, uniform adherent film, applied in accordance with the present invention, is not dislodged by temperature shocks and changes. It isolates the inert porcelain support from the oxidizing or other catalytic materials with which the alumina film or base is later impregnated to promote the reactions set forth in the above mentioned copending applications of Eugene J. Houdry. For example, by impregnating the base film with platinum, silver, copper, silver-chromium or copper-chromium or the oxides thereof in the proportions indicated in said Houdry application Serial No. 95,031, highly efficient catalysts are produced for carrying out oxidizing operations. By impregnating the alumina film with other known and suitable catalytic materials, catalysts produced in accordance with the present invention may be employed for hydrocarbon conversion including cracking, polymerization, reforming, aromatization, etc., also for hydrogenation, and for many other reactions as will be apparent to those skilled in the art of catalysis.

The principle and the process of operation herein described have been applied for depositing films of active magnesia, beryllia and thoria on porcelain supports with the same success as with alumina. The thin but highly active film of these materials when formed as herein described on the catalytically inert porcelain or other equivalent support, is characterized by certain very important properties which distinguish from the forms of the same elements which are present in the support. For example, the chemical compounds or combinations ($Al_2O_3$, $SiO_2$, $K_2O$, $Fe_2O_3$, $Na_2O$, etc.) found in porcelain, combine together during the firing period at 2300° to 3900° F. to produce a complex chemical compound or chemical compounds in which individual elements lose their identity, are not in finely divided form, and do not possess catalytic activity. On the other hand, the active oxide base or film which is formed on the support is a very finely divided material which remains in this condition during service and is obtained by precipitation, gel formation, or decomposition of the metal salt or other solution by heat of relatively low temperature. Contrary to the porcelain support, the chemical composition of the active oxide base is not complex: rather, the chemist endeavors to obtain the active base as pure as possible. For instance, a commercial "activated alumina" (catalyst grade) consists of about 99.5 per cent pure alumina, the impurities such as iron, manganese, gallium, calcium, sodium, silicon boron, aggregating together 0.5 per cent or less.

Another characteristic of active alumina, etc., is the crystalline structure of this oxide. For example, aluminum hydroxide, precipitated from a salt such as sodium aluminate with hydrochloric acid, when heated in the range of 800° to 1000° F. becomes the hexagonal crystal oxide, or gamma alumina. If the gamma alumina is then heated in the range of 2100° to 2300° F., or higher, it becomes the trigonal crystal oxide, or alpha alumina. Consequently from the crystalline standpoint, a porcelain support in which alumina is one of the main constituents, consists of alumina chemically combined with other constituents in the complex chemical or ceramic material mentioned above and of alumina in alpha form which is catalytically inert. The alumina base formed as a film on the porcelain support, however, consists of practically pure alumina in gamma form and is a finely divided active oxide and is a part of the catalyst, whether it promotes, assists the catalytic reaction, or combines with another metal or oxide in finely divided form, subsequently added, to make a new combination which is the true catalyst.

The film base is both absorbent and adsorbent, regardless of its degree of hardness, and hence will securely hold other catalytic material by deposition and impregnation. On the other hand, the porcelain support is absorbent only to the extent or degree of its porosity. The combination of the porcelain or equivalent support with the active base adds the strength and solidity of porcelain to the catalytic qualities of the activated alumina or other oxide. However, the combination of porcelain support and active base, although necessary for prolonged life and efficient operation, does not possess the kind and degree of catalytic activity required for oxidation and other reactions until the active base is impregnated with other catalytic material, such as finely divided metal or oxide.

What is claimed is:

1. The process of manufacturing a catalyst structure and composition which comprises uniformly dispersing an active metal oxide, selected from the group consisting of the oxides of aluminum, magnesium, beryllium and thorium, in solid finely divided form in a liquid solution selected from salts of the metals of said group and acids, then applying said mixture to a catalytically inert support and then subjecting the thus coated support to drying and the temperature required to leave on the support a film of the active metal oxide.

2. The process of manufacturing a catalyst structure and composition which comprises uniformly dispersing active alumina in solid finely divided form in a liquid solution selected from salts of the group consisting of the metals aluminum, magnesium, beryllium and thorium, and acids, then applying said mixture to a catalytically inert support and then subjecting the thus coated support to drying and the temperature required to leave on the support a film of the active metal oxide.

3. The process defined in claim 1 in which the catalytically inert support is of relatively low porosity and in which the said mixture is applied to the support by immersion of the support in said mixture.

4. The process defined in claim 1 in which the active metal oxide is dispersed in the said liquid solution by adding the active metal oxide in powdered form to the liquid solution and then grinding, thereby to insure the production of a uniformly dispersed heterogeneous mixture.

5. The process defined in claim 1 in which the weight of the finely divided metal oxide relative to the weight of the liquid solution is between 1:2.5 and 1:12.

6. The process of manufacturing a catalyst structure and composition which comprises uniformly dispersing active alumina in solid finely divided form in a solution of aluminum nitrate, then applying the mixture to a catalytically inert support and then subjecting the thus coated support to drying and the temperature required to leave on the support a film of the active alumina.

7. The process defined in claim 1 in which the catalytically inert support is of low porosity and is immersed in the mixture, and in which the coated support after drying and heating is immersed in a saturated liquid salt solution of a metal of said group and then dried and heat treated to effect decomposition, thus leaving a hardened film on the support.

8. The process defined in claim 6 in which the catalytically inert support is of low porosity and is immersed in the mixture, and in which the coated support after drying and heating is immersed in a solution of aluminum nitrate and then dried and heat treated to effect decomposition of said solution, thus leaving a hardened film on the support.

9. The process defined in claim 1 in which the base film is impregnated with a finely divided catalytic metal to combine with the base film and thereby provide a composition having the required activity for oxidation, the resultant combination constituting a stable catalytic structure.

LOUIS E. MALINA.

REFERENCES CITED

The following references are of record in the file of this patent:

UNITED STATES PATENTS

| Number | Name | Date |
|---|---|---|
| 1,939,647 | Arnold et al. | Dec. 19, 1933 |
| 2,242,627 | Strickland | May 20, 1941 |
| 2,487,466 | Nahin | Nov. 8, 1949 |